United States Patent Office 3,355,999
Patented Dec. 5, 1967

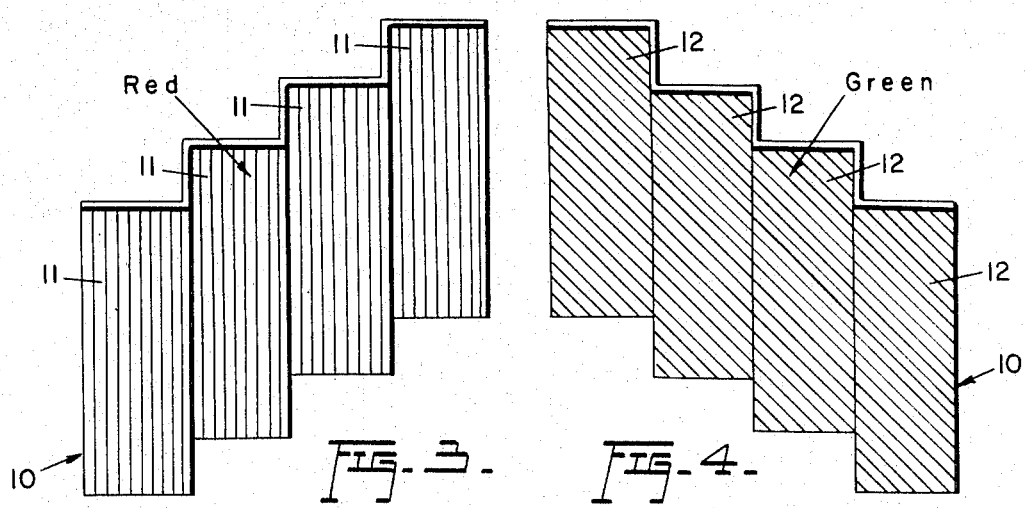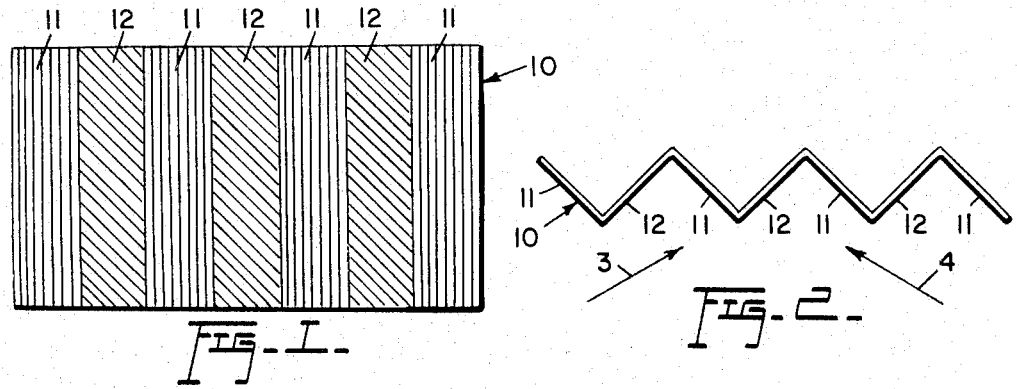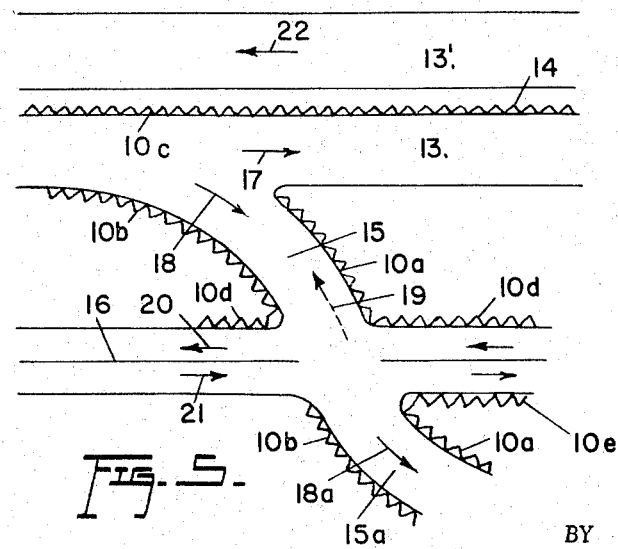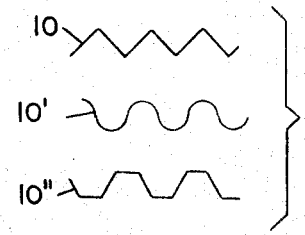
INVENTOR
ROBERT B. RUSLING

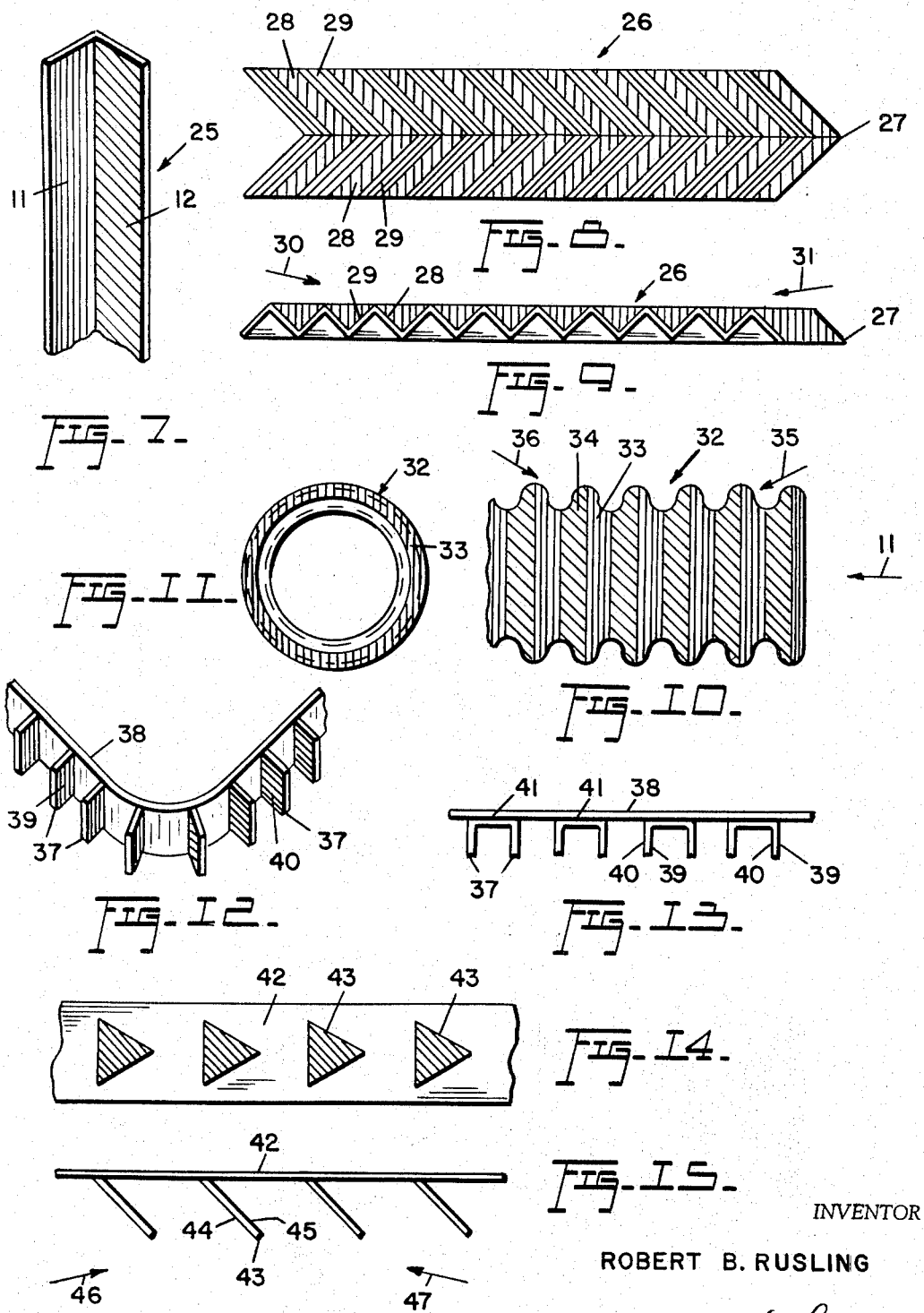

3,355,999
ROAD OR HIGHWAY MARKERS
Robert B. Rusling, 702 Commerce St.,
Jackson, Miss. 39201
Filed Nov. 12, 1964, Ser. No. 412,874
10 Claims. (Cl. 94—1.5)

This application is a continuation-in-part of my copending application Ser. No. 368,873, filed May 20, 1964, and now abandoned.

This invention relates to new and useful improvements in road or highway markers, and the principal object of the invention is to provide directional guidance for vehicles traveling along roads intended for flow of traffic in one direction only. By so doing, the directional road markers of the invention also provide an effective warning for vehicles traveling in the wrong direction, so that drivers thereof may take corrective action and avoid possible collisions.

Briefly, the directional road marker of the invention comprises a structural element which is adapted to be placed alongside of a roadway, such an element having a portion or portions visible from one direction of travel only, and another portion or portions visible only from the opposite direction. The two different portions or sets of portions are differently colored, such as for example, green for one and red for the other, so that the driver of a vehicle on a "one way" road sees only the green portions of the markers when traveling in the proper direction, but sees only the red portions if he is going the "wrong way."

Structurally, the markers may be in the form of individual posts provided at intervals alongside the road, or in the form of continuous stripping, or in the form of individual strips or plates placed at strategic locations, or of special construction, several examples of which are hereinafter disclosed. However, in all instances, the marker has at least two distinct portions or faces of contrasting colors such as red and green for purposes of directional indication. As such, the marker does not depend upon signs or legends which often cannot be read or are not understood. Also, it does not require illumination at night, other than light from the vehicle's headlamps.

As another feature, the marker of the invention may be in the shape of an arrow pointing in the direction of proper travel, the arrow having green portions which are visible in that direction and red portions which are visible in the opposite or "wrong" direction, whereby the coloring of the marker is effectively coordinated with the orientation of the arrow.

Although the markers of the invention may be used generally alongside of simple roads as well as multiple lane highways, they are particularly well suited for use at so-called "cloverleaf" interchanges and entrances or exits of divided highways, and the like, where unidirectional traffic flow is mandatory and where accidents are often caused by vehicles moving in an improper direction.

Some of the advantages of the invention reside in its simple construction, efficient and dependable operation, and in its adaptability to convenient and economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is an elevational view of a directional road marker strip illustrative of one embodiment of the invention;

FIGURE 2 is a top plan view thereof;

FIGURE 3 is a perspective view, taken substantially in the direction of the arrow 3 in FIGURE 2;

FIGURE 4 is a perspective view, taken substantially in the direction of the arrow 4 in FIGURE 2;

FIGURE 5 is a diagrammatic illustration of a roadway system with markers of the invention applied thereto;

FIGURE 6 is a diagrammatic showing of various sectional forms of the marker strip;

FIGURE 7 is an elevational view in fragmentary form, of the marker as a simple post;

FIGURE 8 is an elevational view of the marker in the shape of an arrow;

FIGURE 9 is a side edge view of the marker shown in FIGURE 8;

FIGURE 10 is a fragmentary elevational view of another modified embodiment;

FIGURE 11 is an end view, taken in the direction of the arrow 11 in FIGURE 10;

FIGURE 12 is a fragmentary perspective view of another modified embodiment;

FIGURE 13 is a fragmentary plan view of another modification;

FIGURE 14 is a fragmentary elevational view of still another modification; and

FIGURE 15 is a fragmentary plan view of the embodiment shown in FIGURE 14.

Referring now to the accompanying drawings in detail, more particularly to FIGS. 1–4, one embodiment of the road marker of the invention comprises a horizontally elongated, vertically disposed strip 10 of any suitable material such as metal, plastic, etc., which is provided with transverse corrugations so that it is longitudinally zig-zagged, as will be apparent from FIG. 2.

By virtue of these corrugations each side of the strip presents one set of portions or faces 11 which are visible only from one direction, for example the direction of the arrow 3 in FIG. 2, and a second set of portions or faces 12 which are visible only from the opposite direction, for example, the direction of the arrow 4 in the same figure. The two sets of faces 11, 12 are of different colors, for example, the faces 11 may be red and the faces 12 may be green, or vice versa, it being apparent that the color presentation is reversible by a simple inversion of the strip, as will be presently explained. However, for sake of explanation herein, the faces 11 may be regarded as red in color and the faces 12 as green.

When the strip is viewed in the direction of the arrow 3 and as shown in FIG. 3, only the red faces 11 are visible; but when it is viewed in the direction of the arrow 4 and as shown in FIG. 4, only the green faces 12 can be seen. Thus, if the strip is placed alongside of a road, a driver of a vehicle traveling in one direction along the road would see a strip of green color, but if he were traveling in the opposite direction he would see a red strip.

This will be apparent from FIG. 5 which diagrammatically shows an example of a roadway system, with the numerals 13 and 13′ indicating the two sides of a divided highway, 14 a centerstrip therebetween, 15 a turnoff or exit from the highway side 13, the exit being intersected by a "two-way" service road 16 and continuing past the intersection as at 15a. The normal flow of traffic along the side 13 of the highway is in the direction 17 and a turn-off through the exit 15 must be made in the direction 18. Thus, the directional marker strip 10 is applied to the side edges of the exit road 15 as indicated at 10a and 10b so that the driver of a vehicle moving properly through the exit in the direction 18 sees only the green faces 12 of the strip. However, if a vehicle were to enter the exit (for example from the service road 16) in the wrong direction as indicated at 19, its driver would see only the red faces 11 of the strips 10a and 10b, thus warning the driver that he is moving against the flow of traffic. A directional marker strip 10c installed along the highway side 13 of the centerstrip 14 opposite the exit 15 would readily enable a vehicle erroneously entering the exit to take corrective measures by turning right from the exit and joining the traffic flow 17 along the highway side 13, inasmuch as a driver moving through the exit 15 in the wrong direction 19 would see the strip 10c as green to the right, but as red to the left.

If the traffic flow in the exit extension 15a is also unidirectional as at 18a, the marker strips 10a and 10b would continue therealong, as shown. On the "two-way" service road 16, appropriate indicator strips 10d and 10e would be provided for the respective directions of travel 20, 21.

It will be noted that when the marker strip is standing on one of its longitudinal edges and is viewed in one direction, as for example in FIG. 3, the red faces 11 are visible. However, if the strip is inverted to stand on its other longitudinal edge and is still viewed in the same direction, the green faces 12 appear. Thus, it is possible to utilize the same strip selectively at various locations such as 10a, 10b, 10c, 10d, etc., with faces of a proper color being displayed for a particular direction of traffic movement. Also, in instances where the same strip is used between two parallel roads, as for example, along the centerstrip 14, both sides of the strip may be appropriately colored so that traffic moving in the proper directions 17 and 22 on the respective highway sides 13 and 13' would see the strip as green, but to traffic moving along the same roadways in the improper direction the strip would appear as red.

The coloring of the strip is preferably light-reflective, so that it is easily visible at night by illumination from vehicle headlamps, without any other lighting being necessary.

FIG. 6 illustrates various sections which the strip may have. For example, the strip 10 has an angular zig-zag formation, the strip 10' is undulated, and the strip 10" is truncated. Of course, other suitable sectional configurations may be used.

FIG. 7 shows a modified embodiment of the invention in the form of a simple post made of angle iron, or the like, indicated at 25. The post has a pair of angularly disposed faces 11, 12 colored red and green, respectively, which are visible from relatively opposite directions of travel.

FIGS. 8 and 9 show another modified embodiment wherein the marker 26 is in the form of an arrow having its point at 27. The arrow-shaped marker is provided with transverse corrugations similar to those in the strip 10, except that they extend obliquely and are V-shaped when viewed in elevation as in FIG. 8, in conformity with the shape of the arrow. The corrugations present a set of red colored faces 28 and a set of green colored faces 29, the green faces 29 being visible in the direction 30 which is the direction in which the arrow is pointing, while the red faces 28 are visible in the relatively opposite direction 31. Thus, the directional indication provided by the differently colored faces is coordinated with the orientation of the arrow, as will be apparent.

FIGS. 10 and 11 show another modification of the marker embodied in a corrugated pipe or tubing 32, the corrugations in this instance being annular and alternately forming crests and valleys therebetween. The portions 33 of the corrugations from the crest to the valley on one side are colored red, while the similar portions 34 on the other side are colored green, so that when the pipe is viewed in the direction 35 it appears as red and when viewed in the direction 36 it appears as green.

FIG. 12 illustrates another modified embodiment wherein a plurality of flat plates 37 are suitably secured to a supporting strap or rail 38, the plates 37 having a red colored side 39 and a green colored side 40. The plates are spaced along the length of the supporting strap 38 and if the latter is straight, the red sides or faces of all the plates are visible from one direction and the green sides or faces from the other. However, the strap may be curved as shown, so that the red faces of the plates appear at one side of the curvature and the green faces at the other side. Such an arrangement may be employed, for example, at a location where a road is forked and traffic is permitted to flow only along one branch of the fork.

FIG. 13 shows a further embodiment which is similar to that in FIG. 12, except that the plates 37 are formed by side portions of U-shaped brackets 41, the center portions of which are secured to the supporting strap or rail 38. As in the embodiment of FIG. 12, the rail or strap 38 in FIG. 13 may be curved, or straight as shown.

Finally, the further modified embodiment shown in FIGS. 14 and 15 utilizes a supporting strap 42 which is provided at longitudinally spaced points with a set of triangular plates 43 having green sides or faces 44 and red sides or faces 45, the plates 43 being disposed obliquely to the strap 42 with the green faces 44 visible in the direction 46 and the red faces 45 visible in the direction 47. By virtue of their triangular shape and oblique disposition, the plates 43 appear as a series of arrows pointing in the "green" direction, so in this respect the embodiment of FIGS. 14, 15 is similar to that of FIGS. 8 and 9. The plates 43 may be formed separately from the strap 42 and suitably affixed thereto, or they may be struck out from the strap, if so preferred.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. The combination of a roadway intended for vehicular traffic in only one direction, and a directional marker positioned at one side of said roadway, said marker being elongated in parallelism to the roadway and being configured so as to provide two sets of longitudinally juxtaposed surface portions oriented alternately in relatively opposite directions, one set of said surface portions having a color indicative of safety and being visible only in the direction of intended traffic flow along said roadway, and the other set of said surface portions having a contrasting color indicative of danger and being visible only in the direction opposite to the intended traffic flow.

2. The combination as defined in claim 1 wherein said marker is arrow-shaped and has a pointed end oriented in the direction of intended traffic flow along said roadway.

3. A directional marker adapted to be positioned at one side of a roadway intended for vehicular traffic in only one direction, said marker being horizontally elongated and configured so as to provide longitudinally juxtaposed surface portions oriented alternatively in relatively opposite directions, one set of said surface portions being visible in one direction and having a color indicative of safety, and the other set of said surface portions being visible in the relatively opposite direction and having a contrasting color indicative of danger.

4. The device as defined in claim 3 wherein said marker is arrow-shaped and has a pointed end oriented in the direction in which the safety colored set of said surface portions is visible.

5. A directional marker for vehicular traffic comprising a corrugated strip of material having two sets of faces on the same side thereof visible from relatively opposite directions, the faces in each set having a color in marked contrast to those in the other set, one set of faces indicating that the vehicle is moving in the right direction and the other indicating that the vehicle is moving in the wrong direction.

6. A directional marker for vehicular traffic comprising a horizontally elongated strip of material disposed in a vertical plane and provided with vertical corrugations whereby the strip presents on the same side thereof two sets of faces visible from relatively opposite directions, the faces in each set having a color in marked contrast to those in the other set, one set of faces indicating that the vehicle is moving in the right direction and the other indicating that the vehicle is moving in the wrong direction.

7. The marker as defined in claim 6 wherein said faces in one set are of a red color and those in the other set are of a green color.

8. In combination with a vehicular road intended for flow of traffic thereon in one direction only, a directional road marker comprising a horizontally elongated strip of material disposed in a vertical plane alongside of said road, said strip being provided with vertical corrugations whereby the side of said strip facing the road presents one set of faces visible only from said one direction of traffic flow and a second set of faces visible only from a relatively opposite direction, the first mentioned set of faces having a green color to indicate that a vehicle is traveling in the right direction and said second set of faces being colored red to indicate that the vehicle is traveling in the wrong direction.

9. A directional marker for vehicular traffic comprising a member having at least two vertical faces disposed substantially at right angles to each other and visible from relatively opposite directions, said two faces being contrastingly colored, one face indicating that a vehicle is traveling in the right direction and the other indicating that the vehicle is traveling in the wrong direction.

10. The marker as defined in claim 9 wherein one of said faces is of red color and the other is of a green color.

References Cited

UNITED STATES PATENTS

| | | |
|---|---|---|
| 856,519 | 6/1907 | Deeks. |
| 2,489,499 | 11/1949 | Pellar. |
| 2,513,972 | 7/1950 | Stitt. |
| 3,103,859 | 10/1963 | Dye _____ 94—1.5 X |
| 3,214,142 | 10/1965 | Brown _____ 256—13.1 |

FOREIGN PATENTS

| | | |
|---|---|---|
| 500,680 | 2/1939 | Great Britain. |
| 537,888 | 7/1941 | Great Britain. |

JACOB L. NACKENOFF, *Primary Examiner.*